US010323147B1

(12) United States Patent
Brewster et al.

(10) Patent No.: US 10,323,147 B1
(45) Date of Patent: Jun. 18, 2019

(54) ASPHALT COMPOSITION CONTAINING ESTER BOTTOMS

(71) Applicant: Marathon Petroleum Company, Findlay, OH (US)

(72) Inventors: Stormy Brewster, Hebron, KY (US); Steve Jones, Cincinnati, OH (US); Dennis Keppers, Findlay, OH (US)

(73) Assignee: Marathon Petroleum Company LP, Findlay, OH (US)

( * ) Notice: Subject to any disclaimer, the term of this patent is extended or adjusted under 35 U.S.C. 154(b) by 0 days.

(21) Appl. No.: 15/586,807

(22) Filed: May 4, 2017

Related U.S. Application Data

(60) Provisional application No. 62/341,700, filed on May 26, 2016.

(51) Int. Cl.
*C08L 95/00* (2006.01)
*C12P 7/64* (2006.01)
*C11B 13/00* (2006.01)

(52) U.S. Cl.
CPC ............. *C08L 95/00* (2013.01); *C11B 13/00* (2013.01); *C12P 7/649* (2013.01); *C08L 2207/062* (2013.01); *C08L 2207/066* (2013.01); *C08L 2207/14* (2013.01); *C08L 2207/22* (2013.01); *C08L 2555/34* (2013.01); *C08L 2555/60* (2013.01); *C08L 2555/80* (2013.01); *C08L 2666/04* (2013.01)

(58) Field of Classification Search
CPC .......... C08L 75/00; C08L 91/00; C08L 95/00; C11C 1/00; C11C 1/025; C11C 3/00; C11C 3/006; C11B 11/00; C11B 13/00; C12P 7/64; C12P 7/6436; C12P 7/649; C10L 1/1852; C10L 1/19; C10L 10/14; C10L 10/18
See application file for complete search history.

(56) References Cited

U.S. PATENT DOCUMENTS

| | | | |
|---|---|---|---|
| 2,877,129 A | 3/1959 | Heardman et al. | |
| 5,911,817 A | 6/1999 | Hayner | |
| 6,156,113 A | 12/2000 | Pasquier | |
| 6,514,331 B2 | 2/2003 | Varnadoe et al. | |
| 6,514,332 B2 | 2/2003 | Varnadoe et al. | |
| 6,749,677 B2 | 6/2004 | Freisthler | |
| 6,764,542 B1 | 7/2004 | Lackey et al. | |
| 6,776,832 B2 | 8/2004 | Spence et al. | |
| 6,927,245 B2 | 8/2005 | Buras et al. | |
| 7,008,670 B1 | 3/2006 | Freisthier | |
| 8,026,380 B2 * | 9/2011 | Hassan ............... | B01F 7/00766 422/198 |
| 8,206,500 B1 | 6/2012 | Mathis et al. | |
| 8,404,037 B2 | 3/2013 | Naidoo et al. | |
| 2010/0034586 A1 | 2/2010 | Bailey et al. | |
| 2010/0048771 A1 * | 2/2010 | Osborn .................... | C08L 95/00 524/70 |

FOREIGN PATENT DOCUMENTS

WO WO-2007068461 A1 * 6/2007 ............. C04B 26/26

* cited by examiner

*Primary Examiner* — Alexandra M Moore
(74) *Attorney, Agent, or Firm* — Schaffer, Schaub & Marriott Ltd

(57) ABSTRACT

This invention involves the addition of ester bottoms to an asphalt paving composition to improve the usable temperature range (UTR). The ester bottoms are a byproduct of refining a feedstock containing all or a portion of vegetable oil or animal fat.

12 Claims, 9 Drawing Sheets

| Test | Sample A PG64-22 | Ester Bottoms | Sample B PG64-22 | Ester Bottoms | Sample C SDA | Ester Bottoms | Ester Bottoms | Sample D SDA | Ester Bottoms | Ester Bottoms |
|---|---|---|---|---|---|---|---|---|---|---|
| Percent | 0% | 3% | 0% | 3% | 0% | 2.25% | 5.77% | 0% | 3.70% | 7.10% |
| UTR, C | 90C | | | | | | | | | |
| OB HTC | 65 | 89.7 | 91.6 | 91.4 | 85.7 | 87.8 | 89 | 87.4 | 89.8 | 88.8 |
| RTFO HTC | 67.4 | 60.1 | 67.7 | 62.4 | 67.7 | 64.2 | 58.2 | 71.6 | 65.2 | 58.5 |
| | | 62.1 | 68.9 | 63.7 | 69.9 | 67.1 | 60.4 | 73.5 | 67.3 | 61.7 |
| Jnr@3.2kPa | 2.859 | 2.6 | 2.331 | 2.142 | 1.883 | 2.946 | 3.272 | 1.098 | 2.8658 | 2.904 |
| %Rec@3.2kPa | 1 | 1.1 | 0.6 | 0.8 | 2.2 | 1.2 | 0.7 | 4.8 | 0.9493 | 1.1 |
| Jnr diff | 15.3 | 16.5 | 11.7 | 10 | 16.2 | 17.5 | 18.2 | 13.7 | 12.6648 | 17.3 |
| RV @135 | 392 | 302 | 448.3 | 338.3 | 449 | 362.5 | 258 | | 392.5 | 285 |
| RV @165 | 119 | 97 | 123.3 | 103.3 | 132 | 106.7 | 88.3 | | 120 | 92.5 |
| Flash, COC C | 328 | 320 | 328 | 310 | | | | 359 | | 338 |
| Penetration | | | | | 49 | 72.4 | | 49.5 | 78.4 | |
| Mass Change | -0.22 | -0.3 | -0.47 | -0.63 | 0.09 | 0.075 | -0.115 | | -0.084 | -0.187 |
| Aging Ratio @ 64C | 3.03 | 2.9 | 2.63 | 2.68 | | 3.25 | 2.96 | | 2.92 | 3.18 |
| Aging Ratio @ 58C | | | | | | | | | | |
| PAV ITC | 3362 | 3720 | 3904 | 4314 | 4220 | 2768 | 2569 | 5542 | 2868 | 2605 |
| BBR@-6C m value | 0.32 | | | | 0.307 | | | 0.299 | | |
| BBR@-6C Stiffness | 136 | | | | 83.5 | | | 108 | | |
| BBR@-12C m value | 0.32 | | 0.33 | | 0.286 | 0.308 | | 0.27 | 0.316 | |
| BBR@-12C Stiffness | 136 | | 242 | | 159 | 116 | | 214 | 124 | |
| BBR@-18C m value | 0.28 | 0.31 | 0.262 | 0.322 | 0.286 | 0.278 | 0.316 | | 0.279 | 0.312 |
| BBR@-18C Stiffness | 266 | 183 | 474 | 258 | 159 | 2.39 | 144 | | 232 | 152 |
| BBR@-24C m value | -29.1 | 0.272 | | 0.242 | | 0.282 | | | |0.281 |
| BBR@-24C Stiffness | -25 | 356 | | 636 | | 282 | | | | 294 |
| LTCs | -29.1 | -32.5 | -23.9 | -29 | -27.9 | -29.9 | -34.6 | -25 | -30.5 | -34.2 |
| LTCm | -25 | -29.6 | -24.6 | -29.6 | -18 | -23.6 | -30.8 | -15.8 | -24.6 | -30.3 |
| delta LTC (s-m) | -4.1 | -2.9 | 0.7 | 0.6 | -9.9 | -6.3 | -3.8 | -9.2 | -5.9 | -3.9 |

FIG. 4

| Test | Sample E | Ester Bottoms | Ester Bottoms | Sample F | Ester | Ester |
|---|---|---|---|---|---|---|
| Percent | 0% | 6.20% | 11.50% | 0 | 6.30% | 9.60% |
| UTR, C | 95.4 | 94.2 | 91.8 | 94.5 | 92.7 | 91.5 |
| OB HTC | 80.4 | 64.4 | 58.7 | 76.5 | 64.7 | 59 |
| RTFO HTC | 81.4 | 65 | 60.5 | 77.3 | 65.4 | 59.9 |
| Jnr@3.2kPa | 0.3405 | 3.675 | 3.512 | 0.638 | 3.862 | 3.702 |
| %Rec@3.2kPa | 11.5843 | 0.1 | 0.1 | 6.7 | -0.1 | -0.2 |
| Jnr diff | 2.9573 | 12.7 | 11.3 | 8.7 | 12.3 | 14.5 |
| RV @135 | 1025 | 418 | 305 | 812.5 | 420 | 310 |
| RV @165 | 242.5 | 125 | 97.5 | 202.5 | 127.5 | 101 |
| Flash, COC, C | 347 | | 328 | 350 | | 322 |
| Penetration | 22.5 | 113 | | 25.9 | 90.6 | |
| Mass Change | 0.034 | -0.169 | -0.468 | | -0.263 | -0.365 |
| Aging Ratio @ 64C | 76 2.57 | 2.68 | 2.76 | 2.41@76C | 2.41 | 2.46 |
| Aging Ratio @ 58C | | | | | | |
| PAV ITC | 34.4C | 2640 | 2541 | 30.6C | 2079 | 2257 |
| BBR@-6C m value | 0.3 | | | 0.32 | | |
| BBR@-6C Stiffness | 276 | | | 168 | | |
| BBR@-12C m value | 0.24 | | | 0.262 | 0.374 | |
| BBR@-12C Stiffness | 530 | | | 390 | 122 | |
| BBR@-18C m value | | 0.318 | 0.38 | | 0.3 | 0.354 |
| BBR@-18C Stiffness | | 238 | 147 | | 302 | 168 |
| BBR@-24C m value | | 0.258 | 0.298 | | | 0.282 |
| BBR@-24C Stiffness | | 492 | 338 | | | 355 |
| LTCS | -16.8 | -29.9 | -33.1 | -19.8 | -28 | -32.6 |
| LTCm | -16 | -29.8 | -33.9 | -18 | -28 | -32.5 |
| delta LTC (s-m) | -0.8 | -0.1 | 0.8 | -1.8 | 0 | -0.1 |

FIG. 5

ASPHALT COMPOSITION CONTAINING ESTER BOTTOMS

CROSS REFERENCE TO RELATED APPLICATION

The present patent application is based upon and claims the benefit of provisional patent application No. 62/341,700, filed on May 26, 2016.

FIELD OF THE INVENTION

The invention relates to asphalt compositions and the process for the improvement of their properties. The invention further relates to a modified asphalt composition useful for a variety of applications, particularly paving asphalt and for construction materials utilizing such compositions.

BACKGROUND OF THE INVENTION

The invention relates to an asphalt paving composition made with ester bottoms. The Environmental Protection Agency provides a discussion of asphalt roads at http://www.epa.gov/ttn/chief/ap42/cho4/final/c4s05.pdf which is incorporated herein by reference.

Ester bottoms are a low value by-product of vegetable oil or animal fat refining to produce methyl ester. There is little known value for ester bottoms and they are currently marketed for animal feed, lubricants, or other industrial uses at a low price point.

Asphalt materials are used in a wide variety of applications including but not limited to paving asphalt and asphalt shingles. Paving asphalt must be sufficiently durable to withstand high and low temperature extremes without undue wear, cracking or melting. Paving asphalt hardens while in service (age hardening). Age hardening is caused by an increase in viscosity of the asphalt mixture and the gradual loss of flexibility. The degree and the rate of the hardening of the paving asphalt composition or cement are factors affecting the durability of an applied surface. It is believed that the reaction of the asphalt composition with atmospheric oxygen is the principle cause of asphalt hardening in pavement. Therefore, the asphalt industry has long sought to reduce age hardening.

Some conventional refined asphalts have been found to be incapable of meeting some requirements for resistance to either low temperature thermal cracking or high temperature rutting resistance in certain climates. Modifiers such as elastomers, plasterers, chemical gellants, and chemical modifiers can be effective in improving either, or sometimes both, low temperature thermal cracking or high temperature rutting resistance. These modifiers have varying levels of effectiveness and cost.

Conventional practice to improve low temperature properties adds softer asphaltic compounds, aromatic oils, or other additives to soften or plasticize the asphalt composition. In order to reach acceptable low temperature properties, excessive amounts of soft asphaltic materials or fluxes may be required.

In addition, aromatic oils used in combination with polymers can improve the rutting resistance of asphalt. However, many times, the level of polymer required to reach the desired level of rutting resistance becomes undesirable as a result of excessive cost, rendering the composition not feasible for use as a paving composition.

Asphalt compositions may be derived, as indicated from any well-known bituminous or asphaltic substance obtained from natural sources or derived from a number of sources such as, shale oil, coal tar, and the like as well as the mixtures of two or more of such materials. As indicated, paving grade asphalt compositions are preferred in the present invention. Such paving asphalt compositions are often referred to as viscosity, penetration graded, or performance graded (PG) asphalts having penetration up to 400 as measured by ASTM method D5.

As a result of the 1987 Intermodal Surface Transportation Efficiency Act (ISTEA), a $150 million research study was commissioned in which $50 million was spent towards asphalt research for improving asphalt pavements. As a product of that research which was concluded in 1992, the Strategic Highway Research Program (SHRP) produced what is now known as the Superpave Performance Graded Binder Specification in which asphaltic binders are graded or characterized according to their relative performance in resistance to rutting, shoving or deformation at high temperatures, fatigue at intermediate temperatures, and thermal cracking resistance at low temperatures. Asphalts which normally would be graded either under the penetration or viscosity specifications are now graded as PG (Performance Graded) binders. As such, their designation will be representative of their resistance at both high and low temperature, indicating their useable temperature range (UTR) as a PG AA-BB where AA=high temperature resistance In degrees Celsius and BB is low temperature cracking resistance m minus degrees Celsius, i.e., PG 64-22 would prevent rutting up to 64° C. (147° F.) and low temperature cracking to a minus 22° C. (−72° F.). Preferred asphalts are the performance graded asphalts such as PG 46-40, PG 46-34, PG 46-28, PG 52-40; PG 52-34; PG 52-28: PG 52-22, PG 58-40, PG 58-34, PG 58-28, PG PG 58-22, PG 64-40, PG 64-34, PG64-28, PG 64-22, PG 70-40, PG 70-34, PG 70-28, PG 70-22, PG 76-40, PG 76-34, PG 76-28, PG 76-22, PG 82-34, PG 82-28, or PG 82-22. The PG in the title referring to Performance Graded, the first numeric designation referring to the binders high temperature rutting or deformation resistance temperature range limit. The last numeric designation references the cracking resistance temperature limit of the binder.

Areas of high loading or slow or standing traffic as well as areas where temperature extremes can be experienced in excess of 86° C. (187° F.) between high and low temperature levels will require the use of modifiers to obtain the increased useful temperature range. As a result, it has been common to start with softer asphalts to reach low temperature properties, while adding modifiers such as polymers to achieve high temperature rutting resistance. The use of aromatic oils also aids low temperature properties. As such, extensive levels of polymer addition is required to regain high temperature properties, especially when using aromatic oils. The use of aromatic oils can solvate the polymer to a higher degree and thus require a higher level of polymer to be used to obtain the desired high temperature rutting resistance.

A common practice of softening asphalts in the industry is to add heavy vacuum gas oil (HVGO) to paving asphalt to reach the desired useable temperature range (UTR). HVGO may be added after refining or, in some applications, it is not refined out of the asphalt materials. HVGO is a valuable commodity currently selling at about $150/ton premium over the price of asphalt, depending on the market. Therefore, adding HVGO to asphalt is an undesirable fix as it increases the cost of paving asphalt.

Notwithstanding the considerable efforts previously expended to provide an improved asphalt paving composition, there remains a continued need to increase the useable temperature range and reduce the cost associated with manufacturing asphalt paving materials. The present invention addresses both of these needs.

SUMMARY OF THE INVENTION

In producing methyl esters, including biodiesel, a feedstock containing all or a portion of vegetable oil or animal fats is reacted and refined to produce finished products. As a part of this process, a number of by-products are produced, having varying degrees of value. On the low end of the value spectrum are ester bottoms. Ester bottoms are a co-product of refining methyl ester including biodiesel, that is not glycerin or skimmed fatty acids. Ester bottoms generally contain methyl esters, monoglycerides, diglycerides. triglycerides, sodium soaps produced from the addition of sodium methoxide (catalyst), and unsaponafiables. The unsaponafiables generally make up about 10% of the ester bottoms. Ester bottoms, as used in the preferred embodiment of this invention, have a viscosity range 10-900 cP at 64 degrees Celsius.

In the preferred embodiment, the invention involves the addition of ester bottoms to an asphalt paving composition to improve the useable temperature range (UTR). Very specifically, the ester bottoms affect the low temperature properties more significantly than the high temperature properties. Generally, the modified asphalt composition will comprise (a) about 0.1% to about 50% of ester bottoms, (b) about 0 to about 20% of a polymer modifier, (c) 50 to about 99.9% of an asphalt obtained from conventional vacuum distillation, solvent refining or naturally occurring mineral sources.

Refiners, or user producers, will often add a polymer to paving asphalt to increase the high temperature property of the paving asphalt for warmer climates. The ester bottom modified asphalt paving composition increases the useful temperature range. Therefore the amount of polymer additive required to reach a desirable higher temperature range can be reduced, thus reducing the cost of manufacturing pavement asphalt.

Another advantage of the invention is the amount of ester bottoms used to produce a desired finished product is less than the amount of HVGO (heavy vacuum gas oil), or other modifiers currently available, required to produce an equivalent amount of finished product.

A typical paving asphalt mixture comprises a mixture of components. Principal ingredients of the paving asphalt mixture are an asphalt composition or cement and aggregate or aggregate material. In such mixtures, the ratio of asphalt composition to aggregate material varies, for example, according to the aggregate material type and the nature of the asphalt composition. As used herein, the terms "asphalt composition", "asphalt cement" or "asphalt binder" are understood to refer to any of a variety of organic materials, solid or semi-solid at room temperature, which gradually liquefy when heated, and in which the predominate constituents are naturally occurring bitumen, e.g., Trinidad Lake, or residues commonly obtained in petroleum, synthetic petroleum, or shale oil refining, or from coal tar or the like. For example, vacuum tower bottoms produced during the refining of conventional or synthetic petroleum oils is a common residue material useful as an asphalt composition. A "paving asphalt composition", "paving asphalt cement", or "paving asphalt binder", accordingly is an asphalt composition or asphalt cement having characteristics which dispose the composition to use as a paving material. This is contrasted, for example, with an asphalt composition suited for use as a roofing material. "Roofing asphalts", usually have a higher softening point and are thus more resistant to flow from heat on roofs. The higher softening point is generally imparted by the air blowing processes by which they are commonly produced. Paving asphalt mixtures may be formed and applied in a variety of ways, as well understood by those skilled in the art. For example, the paving asphalt composition and the aggregate can be mixed and applied at elevated temperatures while in the fluid state to form the pavement or road surface. See particularly U.S. Pat. No. 5,580,376 to Hayner.

Some examples of polymers used for modifying asphalts include: Styrene Butadiene (SB), ethylene-vinyl-acetate, ethylene-methyl-acrylate, ethylene butyl acrylate, poly-propylene, atactic polypropylene, polystyrene, polyethylene, LDPE, HDPE, oxidized high density poly-propylene, polyphosphoric acid (PPA), natural rubber, polybutadiene, epoxy resins, polyurethane resins, acrylic resins, phenolic resins, gilsonite, lignin, diblock polymers, Styrene-Butadiene-Styrene (SBS), triblock polymers which may be either linear or radial, styrene-isoprene-styrene (SIS), diblocked polymers, hydrotreated SBS, Styrene Ethylene Butadiene Styrene polymers (SEBS), Styrene Butadiene Rubber (SBR), polyacrylamide, e.g., those described in U.S. Pat. No. 4,393,155; Glycidyl-containing ethylene copolymers in U.S. Pat. No. 5,331,028; or Crum Rubbers.

Asphalt is the most recycled material in the world. Milled road surfaces are reused. Many new roads are composed of 20% recycled asphalt and as high as 60% in some applications. The reclaimed asphalt is highly oxidized from years of use, and can be rejuvenated. There are rejuvenate currently on the market at a high price point. Another advantage of the invention is the ester bottoms can be used as a rejuvenator for recycled asphalt.

The ester bottom modified asphalt may have many desirable applications including but not limited to paving asphalt, asphalt emulsions, cutback asphalts, and roofing flux.

Other objects and advantages of the present invention will become apparent to those skilled in the art upon a review of the following detailed description of the preferred embodiments and the accompanying drawings.

IN THE DRAWINGS

FIG. 4 is a table of test results on a number of different asphalt compositions when mixed with various amounts of ester bottoms.

FIG. 5 is a table of test results on a number of different asphalt compositions when mixed with various amounts of ester bottoms.

DETAILED DESCRIPTION OF THE INVENTION

Figure 1:
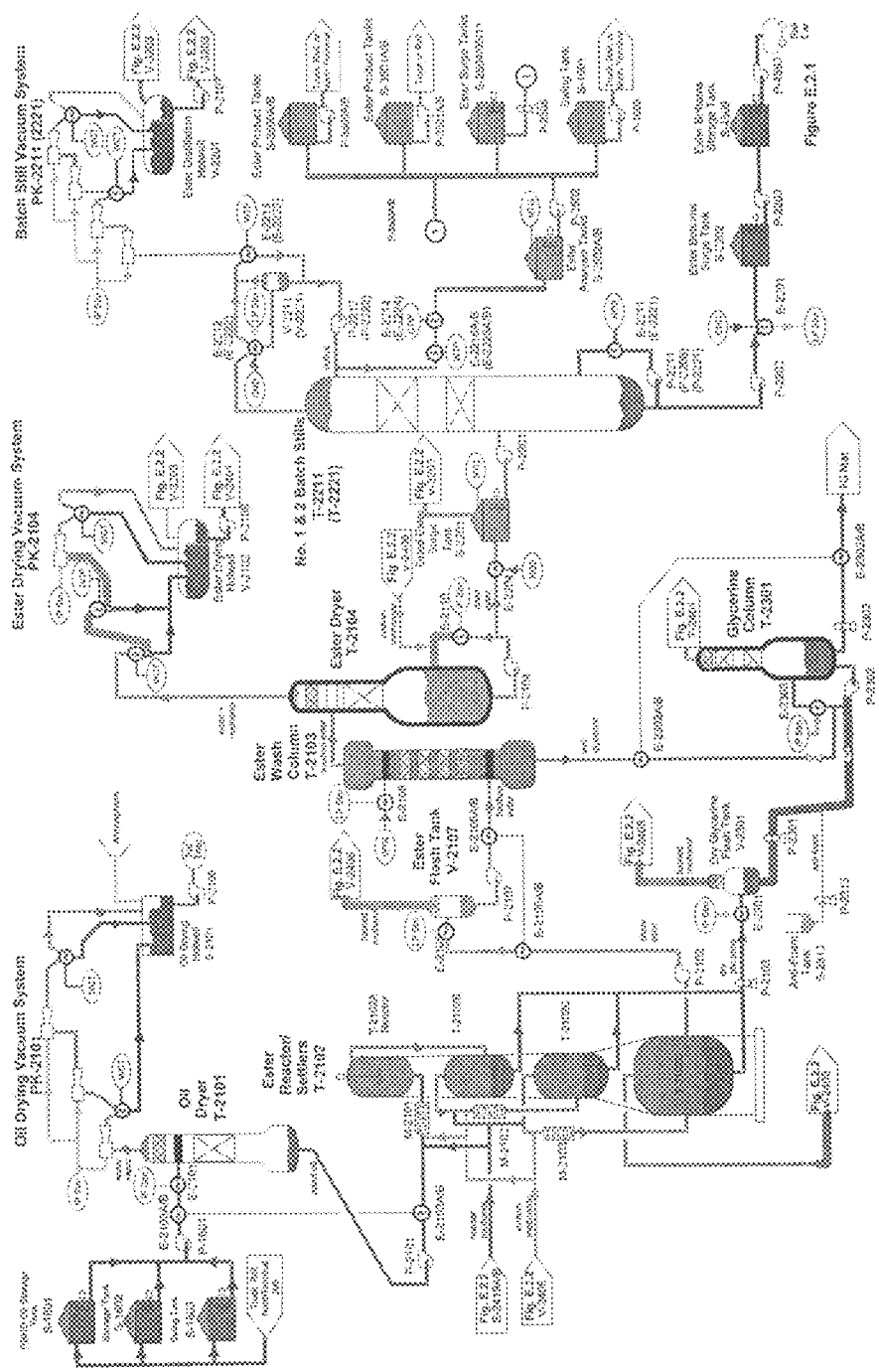
FIG. 1 is a schematic flow diagram for bio-refining.

Referring to FIG. 1 feedstock is brought from the storage tanks to the dryer (T2101) wherein moisture is removed. This dry oil is then fed into a three-stage continuous reactor/settler system (T2102) where methoxide catalyst and methanol are added to each stage. Methanol reacts with the dry oil to produce methyl ester and glycerin. The dry oil is reacted to less than 1% monoglyceride and virtually no diglycerides or triglycerides as it leaves the last settler. Glycerin settles out of the of the reaction mixture and is directed from the reactors downstream for further refining. The ester phase is what remains after the glycerin is removed. The ester phase is then transferred to a single stage flash distillation tank (V-2107) to remove any remaining methanol. The ester phase is then water washed (T2103) to remove glycerin, soap, methanol, and methoxide catalyst. The washed methyl esters are dried under vacuum (T2104) to remove more methanol and water. Sodium methoxide is added to the dryer to back react any glycerin and monoglycerides into diglycerides and triglycerides. The methyl esters leave the ester dryer and are preheated before entering an ester surge tank (S2201). The methyl esters from the ester surge tank are then distilled to separate the purified methyl esters from the ester bottoms. The ester bottoms are transferred from the distillation tower (T2211) to an ester bottom surge tank (S2202) while the purified methyl ester is transferred from the distillation tower to a storage tank for distribution or sale.

The ester bottoms produced in methyl ester refining are added to any suitable asphalt composition or cement, for example, industrial asphalts used for coatings, sealants, roofing materials, adhesives, and other applications. However, paving grade asphalts are used in the preferred embodiment of the invention. The asphalt feed composition will determine the amount of ester bottoms required.

Figure 2:
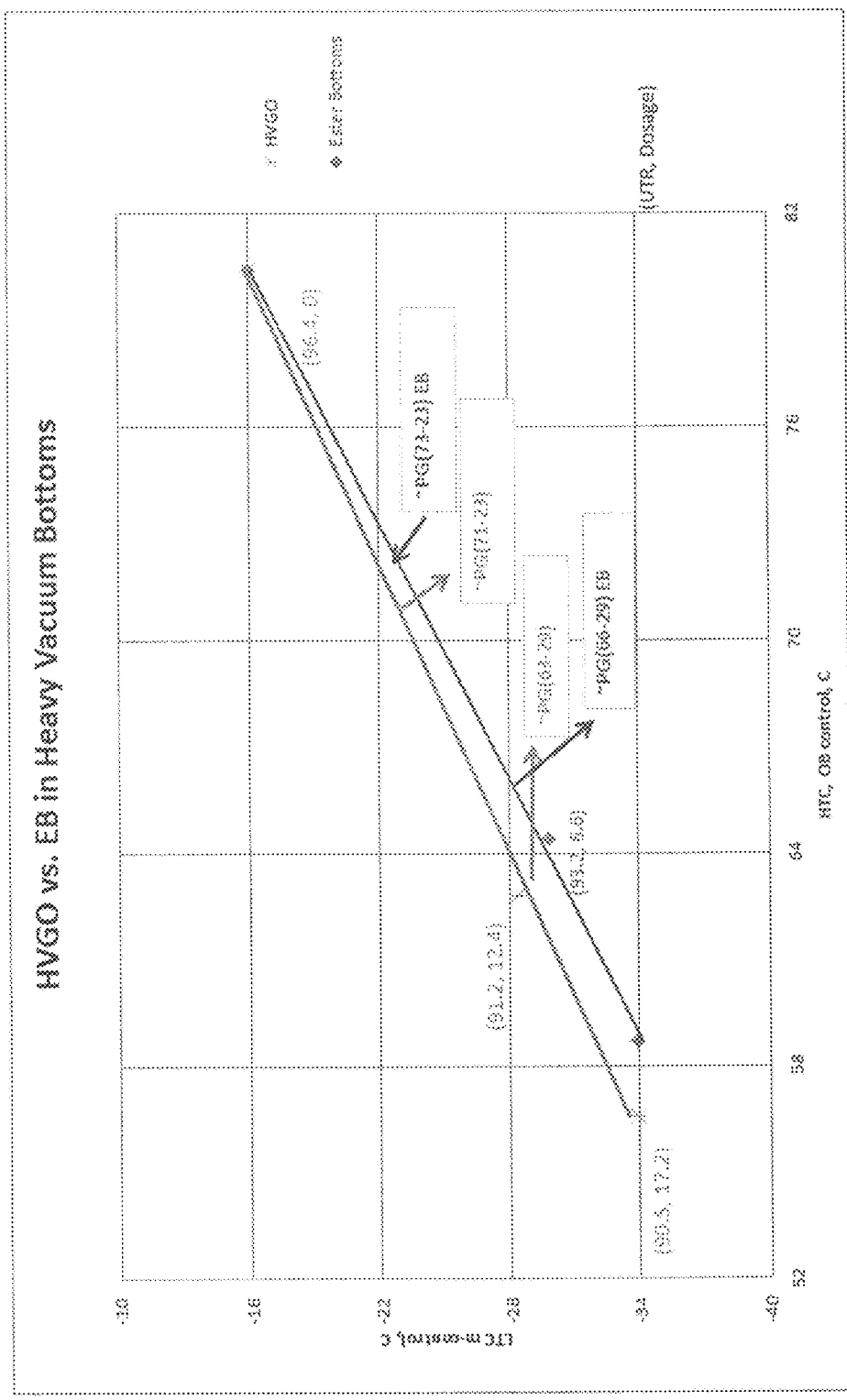
FIG. 2 is a plot of ester bottoms vs. HVGO in asphalt.

Referring now to FIG. 2, there is illustrated a comparison of heavy vacuum gas oil modified asphalt compared with ester bottoms modified asphalt. It can be seen in FIG. 2 that, at similar points, the ester bottoms modified asphalt produces a PG73-23 (UTR=96) versus a HVGO PG71-23 (UTR=94). Similarly, the higher the quantity of modifiers in the asphalt the ester bottoms produce PG66-29 (UTR=95) versus an HVGO PG63-29 (UTR=92). The ester bottoms modified asphalt presents an improved UTR when compared with HVGO modified asphalts.

Figure 3:
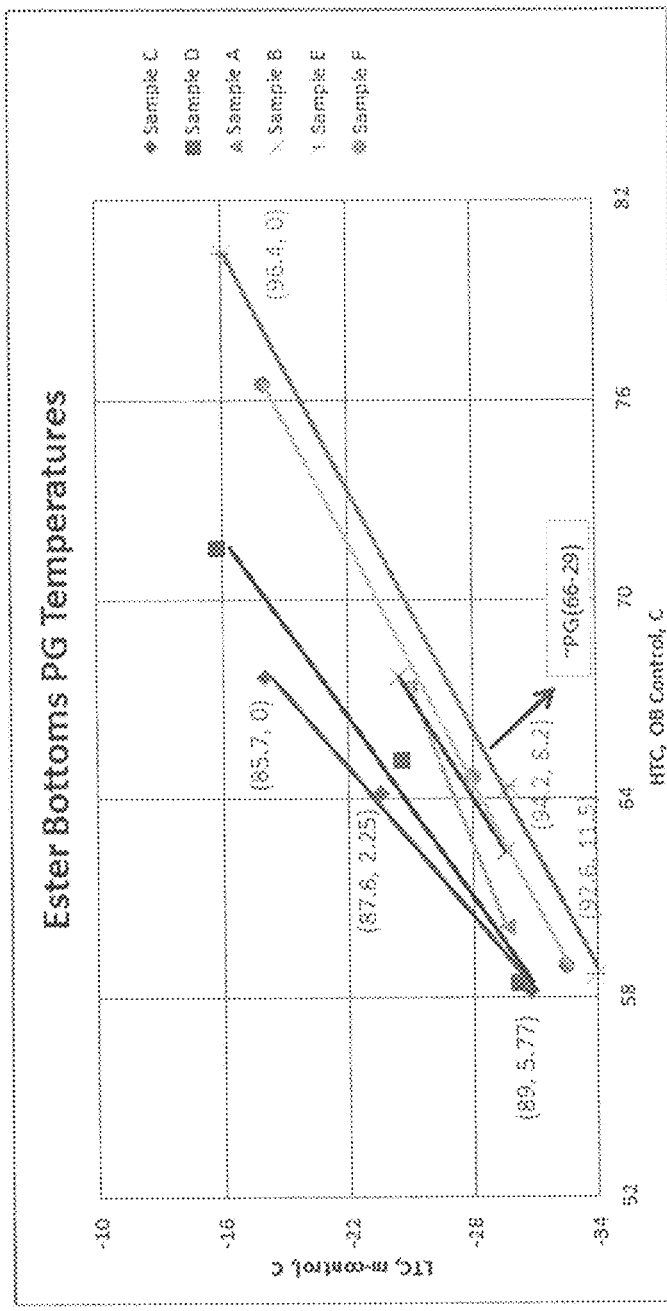
FIG. 3 is a plot of ester bottoms PG temperatures for a number of different asphalt compositions.

The type of asphalt used for the present invention can vary as illustrated by FIGS. 3 and 4. The asphalts may include solvent deasphalting bottoms (SDA). FIGS. 3 and 4 illustrate testing which was done on a PG64-22 (Sample A), PG64-22 (Sample B), and two SDA blends (Samples C and D), and two stiff vacuum tower bottoms blends (Samples E and F). For instance, asphalt from two different refineries (Samples A&B), mixed with 3% ester bottoms resulted in different end products. Similarly, ester bottoms added to SDA or coker feeds affect the finished products differently. Therefore, the weight percentage of ester bottoms required for blending is determined by the asphalt composition.

EXAMPLE 1

Referring now to FIG. 4 a conventional PG 64-22 (Sample A) is used. The control sample at high temperature is approximately 65° C. and the low temperature compliance is actually −25° C. Ester bottoms are added to the Sample A and the resulting product has a high temperature compliance of 60.1° C. and a low temperature compliance of −29.6° C. The useable temperature range of the control equals 86° C. whereas the ester modified composition has a useable temperature range of 89.7° C.

EXAMPLE 2

Referring to FIG. 4, Sample B PG 64-22 has an initial high temperature control of 67.7° C., and the low temperature control is −24.6° C. resulting in a UTR of 92.3. After the addition of 3% ester bottoms the high temperature compliance is 62.4° C., and the low temperature compliance is −29.9° C. resulting in a useable temperature range of 93.2° C., while lowering the lower temperature compliance significantly.

EXAMPLE 3

Referring again to FIG. 4, Samples C & D, SDA blends, were tested. Sample C having a high temperature compliance of 67.7° C. and a low temperature compliance of −18° C. Ester bottoms were added in the amount of 2.25% and 5.77%. The 2.25% ester bottoms addition resulted in a UTR of 87.8° C., while the 5.77% ester bottoms addition resulted in a UTR 89° C. In the Sample D test the 3.70% ester bottoms addition resulted in an 89.8° C. UTR and a 7.1% ester bottoms addition resulted in an 88.8° C. UTR.

It can be seen from FIGS. 2-4 that ester bottoms modified asphalts are at least as good as, if not better at maintaining a UTR than the more expensive HVGO and SDA modified asphalts.

Referring now to FIG. 5, tensile strength testing was employed against three SDA modified binders (1, 2, 3) in comparison with an ester bottoms modified binder (4). Moisture sensitivity results for the three SDA modified PG64-22 asphalts and the ester bottoms modified blend show that the ester bottoms modified blend competed very well against binders 1, 2 and 3. Both dry and wet strains are very strong. During this test a disk-shaped sample of the binder is pulled apart to measure the crack initiation and propagation. By measuring the area under the load and the displacement curve, fracture energy is calculated for the sample. This test provides an understanding of a mixture's ability to resist cracking at both low and intermediate temperatures.

Figure 6:
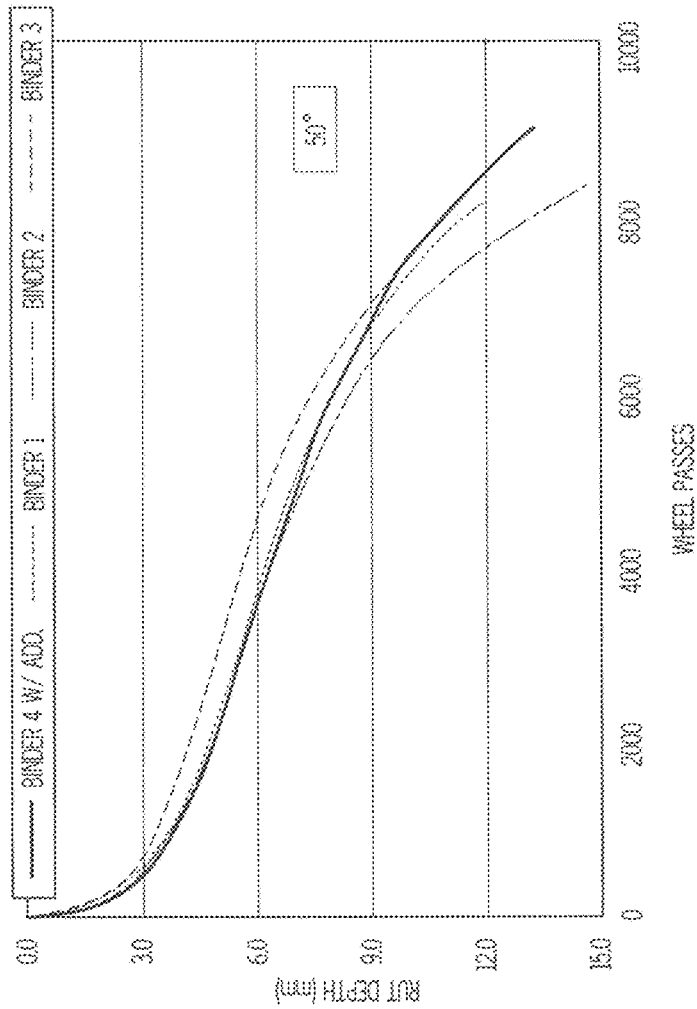
FIG. 6 is a plot of results of tensile tests comparing an ester bottom modified asphalt with three polymer modified asphalts.

Referring now to FIG. 6 the results of a ruling resistance test, known as the Hamburg Wheel Test, compares binders 1, 2 and 3 against ester modified binder 4. Again, the ester modified binder 4 performs favorably when compared to the other refinery produced PG64-22. The test is performed by repeatedly tracking a loaded wheel over samples in heated bath water. The deformation of the samples versus the number of passes is observed. The Hamburg Wheel Test is used to measure both rutting and stripping risks.

Figure 7:
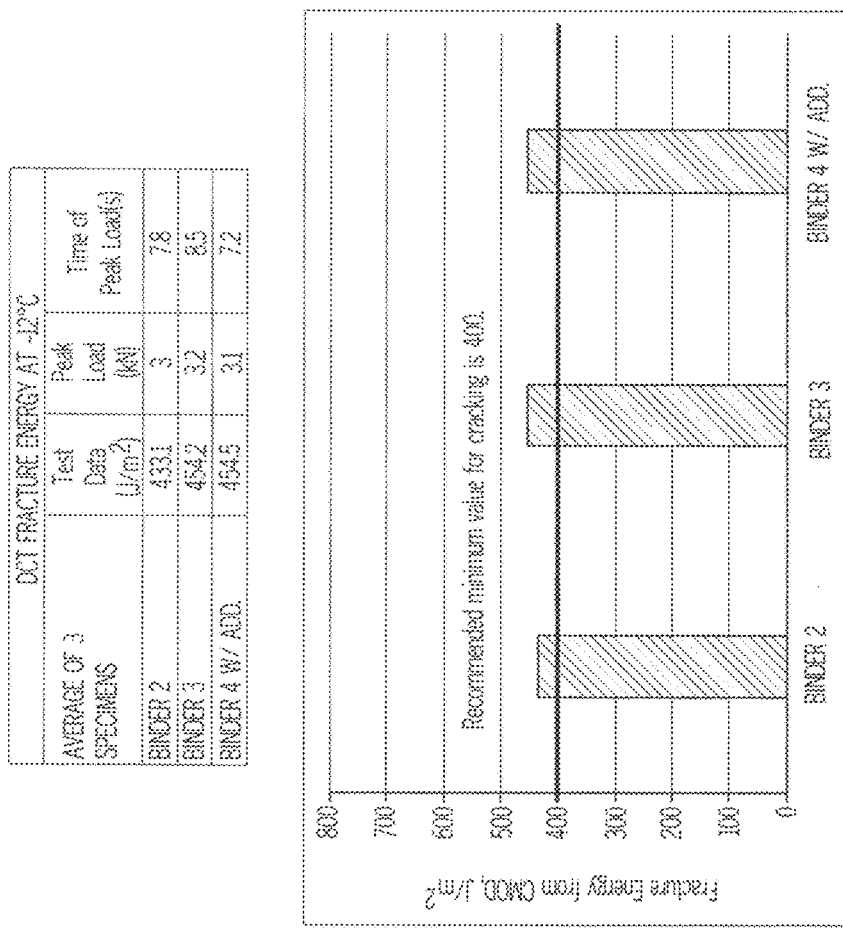
FIG. 7 is a plot of results of a rutting resistance test of an ester bottom modified asphalt with three polymer modified asphalts.

Referring now to FIG. 7 the results of a Disk Shaped Compaction Tension test (OCT) are shown. The OCT is a measure of low temperature and reflective cracking. Binder 4 with the ester bottoms additive was compared against binders 2. and 3. Binder A again provided results equal and favorable to the refinery binders. During this test, one set of samples is tested as it exists. For this test, two sets of each binder are tested. One set of the mixed binders are tested as is under dry conditions. The second set of test binders is put through a freeze/fall cycle and is then conditioned in water.

The strength for each mix is measured from the load required to crack the sample. The reported number of this graph is the strength ratio of the wet versus dry condition. This strength ratio provides information regarding the moisture susceptibility of the asphalt mix.

Figure 8:
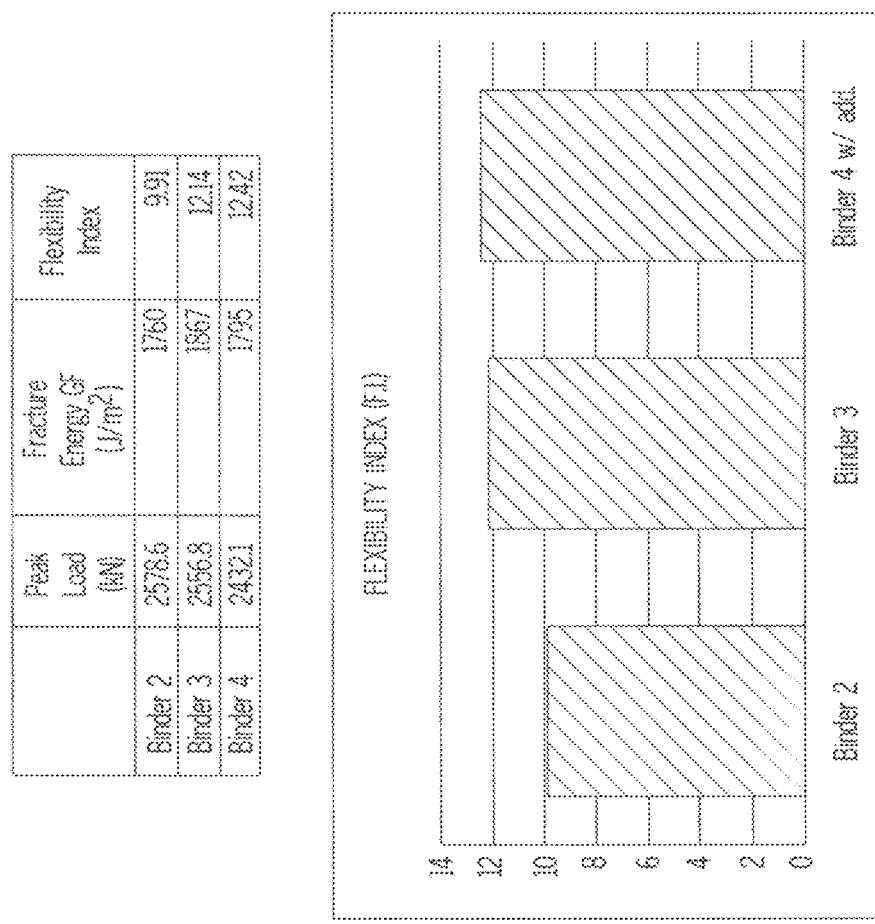
FIG. 8 is a plot of results of a compaction tension test comparing an ester bottom modified asphalt with two polymer modified asphalts.
Figure 9:
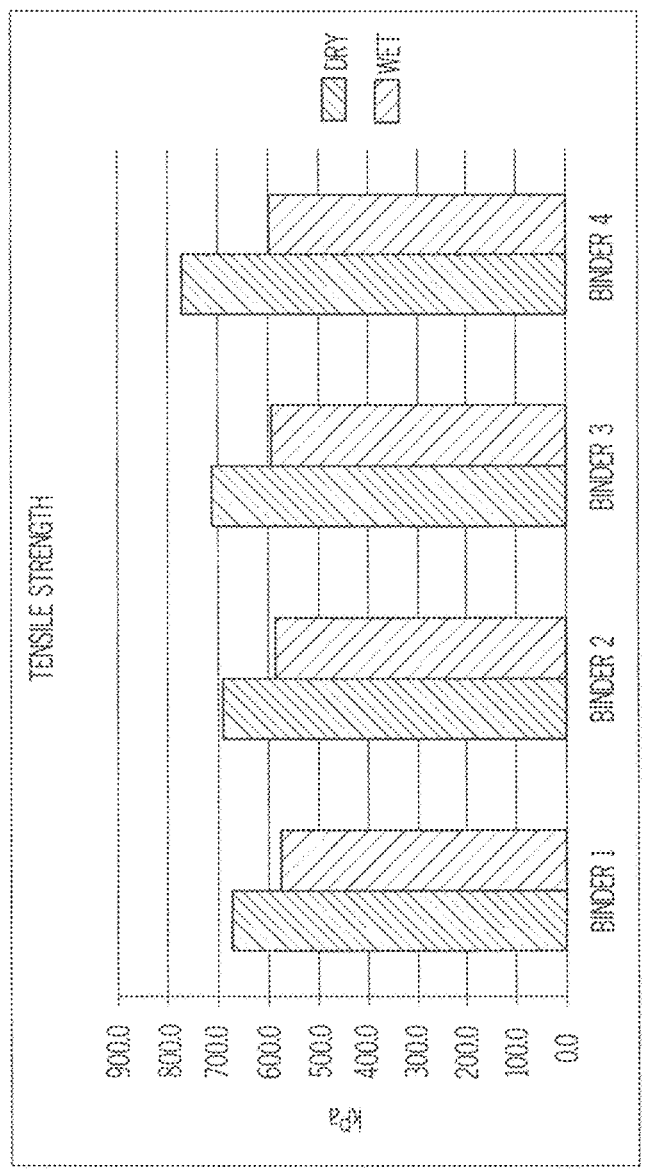
FIG. 9 is a plot of a Semi Circular Bend test comparing an ester bottom modified asphalt with two polymer modified asphalts.

FIG. 8 provides the results of a Semi Circular Bend test against binder 2, binder 3 and binder 4 with ester bottoms. This test provides an indicator of resistance to crack propagation and predicts fracture performance. The test shows that binder 4 with ester bottoms additive performed better than binders 2 and 3. The test is performed by 3 point bending of a semi-circular shaped specimen with an introduced notch. This induces tension at the bottom of the sample, resulting in crack propagation throughout the specimen. The energy required to fracture the sample is calculated. The test is run at normal temperatures.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A modified asphalt composition comprising 50 wt % to about 99.9 wt % of an asphalt, 0 wt % to about 20 wt % of a polymer modifier, and 0.1 wt % to about 50 wt % of ester bottoms, wherein the ester bottoms are a byproduct of methyl ester refining.

2. The asphalt composition of claim 1 wherein the asphalt includes from 20 wt % to 60 wt % recycled asphalt.

3. The asphalt of claim 1 wherein the polymer modifier is selected from the group of Styrene Butadiene (SB), ethylene vinyl-acetate, ethylene-methyl-acrylate, ethylene butyl acrylate, poly-propylene, atactic polypropylene, polystyrene, polyethylene, LDPE, HDPE, oxidized high density polypropylene, poly-phosphoric acid (PPA), natural rubber, polybutadiene, epoxy resins, polyurethane resins, acrylic resins, phenolic resins, gilsonite, lignin, diblock polymers, Styrene-Butadiene-Styrene (SBS), triblock polymers which may be either linear or radial, styrene-isoprene-styrene (SIS), diblocked polymers, hydrotreated SBS, Styrene Ethylene Butadiene Styrene polymers (SEBS), Styrene Butadiene Rubber (SBR), polyacrylamide.

4. The modified asphalt composition of claim 1 wherein the addition of ester bottoms increases the useable temperature range of the asphalt composition.

5. The modified asphalt composition of claim 1 wherein the ester bottoms have a melting point of less than 120° F.

6. The modified asphalt composition of claim 1 wherein the ester bottoms contain sodium soap.

7. A paving asphalt comprising:
50 wt % to about 99.9 wt % of an asphalt mixture;
0.1 wt % to about 50 wt % ester bottoms, wherein the ester bottoms are a byproduct of methyl ester refining; and,
0 wt % to about 20 wt % of a polymer modifier.

8. The paving asphalt of claim 7 wherein the addition of the ester bottoms increases the useable temperature range.

9. The modified asphalt composition of claim 7 wherein the ester bottoms have a melting point of less than 120° F.

10. The modified asphalt composition of claim 7 wherein the ester bottoms contain sodium soap.

11. A paving asphalt comprising 50 wt % to about 99.99 wt % of an asphalt mixture and 0.1 wt % to about 50 wt % of ester bottoms, wherein the ester bottoms are a byproduct of methyl ester refining.

12. The paving asphalt of claim 11 wherein the addition of the ester bottoms increases the lower temperature compliance of the paving asphalt.

* * * * *